United States Patent
Kim

(10) Patent No.: US 9,205,861 B2
(45) Date of Patent: Dec. 8, 2015

(54) ELECTRIC POWER STEERING APPARATUS FOR VEHICLE AND METHOD OF ASSEMBLING THE SAME

(71) Applicant: MANDO CORPORATION, Pyeongtaek-si, Gyeonggi-do (KR)

(72) Inventor: Jong Han Kim, Seoul (KR)

(73) Assignee: MANDO CORPORATION, Pyeongtaek-Si, Gyeonggi-Do (KR)

( * ) Notice: Subject to any disclaimer, the term of this patent is extended or adjusted under 35 U.S.C. 154(b) by 0 days.

(21) Appl. No.: 14/242,428

(22) Filed: Apr. 1, 2014

(65) Prior Publication Data

US 2014/0291063 A1    Oct. 2, 2014

(30) Foreign Application Priority Data

Apr. 2, 2013 (KR) .................. 10-2013-0035689

(51) Int. Cl.
- *B62D 5/04* (2006.01)
- *F16D 3/68* (2006.01)
- *F16H 1/16* (2006.01)

(52) U.S. Cl.
CPC ............... *B62D 5/0409* (2013.01); *F16D 3/68* (2013.01); *B62D 5/0403* (2013.01); *B62D 5/0454* (2013.01); *F16H 1/16* (2013.01); *Y10T 29/49826* (2015.01)

(58) Field of Classification Search
CPC ... B62D 5/0403; B62D 5/0454; B62D 5/0442
USPC ................... 180/444; 464/73, 74, 75
See application file for complete search history.

(56) References Cited

U.S. PATENT DOCUMENTS

| | | | |
|---|---|---|---|
| 3,485,062 A * | 12/1969 | Blake | 464/73 |
| 6,283,867 B1 * | 9/2001 | Aota et al. | 464/74 |
| 6,390,264 B2 * | 5/2002 | Torii et al. | 192/38 |
| 7,401,678 B2 * | 7/2008 | Yuasa et al. | 180/444 |
| 8,464,776 B2 * | 6/2013 | Anthoine | 160/310 |
| 8,814,710 B2 * | 8/2014 | Zhao et al. | 464/73 |
| 2004/0182188 A1 * | 9/2004 | Nakamura et al. | 74/409 |
| 2012/0322566 A1 * | 12/2012 | Kim | 464/88 |
| 2013/0102396 A1 * | 4/2013 | Zhou et al. | 464/73 |
| 2014/0027197 A1 * | 1/2014 | Kikuchi et al. | 180/444 |
| 2015/0041241 A1 * | 2/2015 | Yoshikawa et al. | 180/444 |

FOREIGN PATENT DOCUMENTS

DE    102012010869 A1    12/2012

* cited by examiner

*Primary Examiner* — Joseph Rocca
*Assistant Examiner* — Marlon Arce
(74) *Attorney, Agent, or Firm* — McDermott Will & Emery LLP

(57) ABSTRACT

Disclosed is an electric power steering apparatus for a vehicle and a method of assembling the same. According to the present invention, an elastic member provided between a boss and a worm shaft does not suppress the movement of the worm shaft in the axial direction and in the radial direction, a process of assembling the driving shaft of the motor and the worm shaft can be simplified, and a time required for assembly can be reduced.

12 Claims, 6 Drawing Sheets

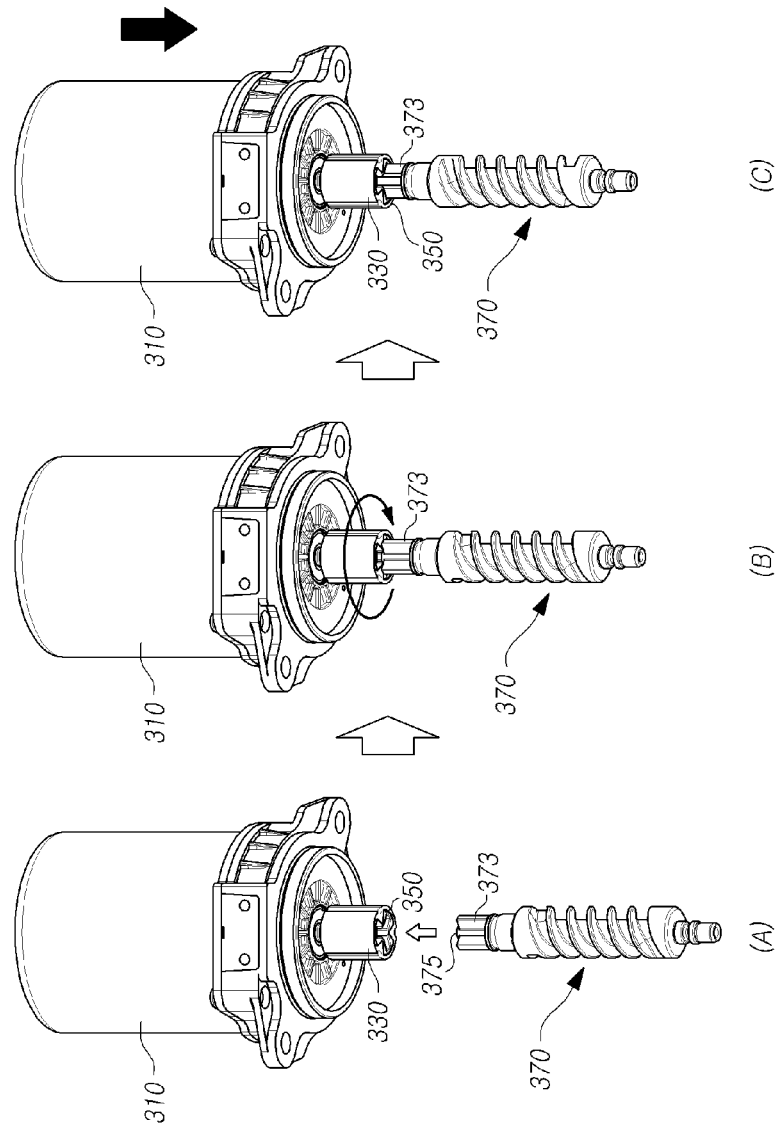

ELECTRIC POWER STEERING APPARATUS FOR VEHICLE AND METHOD OF ASSEMBLING THE SAME

CROSS-REFERENCE TO RELATED APPLICATION

This application claims priority from and the benefit under 35 U.S.C. §119(a) of Korean Patent Application No. 10-2013-0035689, filed on Apr. 2, 2013, which is hereby incorporated by reference for all purposes as if fully set forth herein.

BACKGROUND OF THE INVENTION

1. Field of the invention

The present invention relates to an electric power steering apparatus for a vehicle and a method of assembling the same, and more particularly to an electric power steering apparatus for a vehicle and a method of assembling the same in which an elastic member provided between a boss and a worm shaft does not suppress the movement of the worm shaft in an axial direction and a radial direction, a process of assembling a driving shaft of a motor and the worm shaft can be simplified, and the time required for assembly can be reduced.

2. Description of the Prior Art

FIG. 1 is a cross-sectional view illustrating a part of a motor and a speed reduction mechanism of the motor in a conventional electric power steering apparatus. FIG. 2 is an exploded perspective view illustrating a part of the motor and the speed reduction mechanism of the motor in the conventional electric power steering apparatus.

As illustrated in these drawings, a motor and a speed reduction mechanism of the motor in an electric power steering apparatus includes a motor 180, a driving shaft 105, an inner rotor 120, an outer rotor 115, an elastic body 110, a first bearing 150, a worm shaft 135, a worm 145, a second bearing 170, a compression screw 155, a compression spring 165, and a gear housing 160.

The motor 180 includes a driving shaft 105 extending outside a motor housing and the outer rotor 115, of which the inside is hollow, is connected with the driving shaft 105 at one end to be interlocked with the driving shaft 105.

The first bearing 150 and the second bearing 170 support the worm shaft 135 in such a manner that the worm 145 is fixed to the worm wheel 140 side where a steering shaft 130 is installed. A torsion bar is incorporated in the steering shaft 130.

The compression spring 165 supports the worm 145 toward the worm wheel 140 by being pressed against the compression screw 155 and also supports the second bearing 170. Accordingly, when the compression screw 155 is tightened, the compression screw 155 is moved to contract the compression spring 165. Consequently, the worm 145 can be firmly engaged with the worm wheel 140 by a compressive force of the compression spring 165.

The inner rotor 120 is connected to the worm shaft 135 in which the inner rotor 120 is configured to be inserted into the outer rotor 115 which is connected with the driving shaft 105 at the one end thereof.

Meanwhile, a damping coupler 210 includes the outer rotor 115, the elastic body 110, and the inner rotor 120. The damping coupler 210 interconnects the driving shaft 105 of the motor 180 and the worm shaft 135.

Here, the outer rotor 115 is configured such that the inner rotor 120 may be inserted therein, and the elastic body 110 is provided between the inner rotor 120 and the outer rotor 115.

In addition, the inner rotor 120 is formed with a hole 245 in which serrations are formed in an axial direction and connected with the worm shaft 135, which is machined with first serrations 250 opposed to the serrations of the hole 245. The outer rotor 115 having a hole (not illustrated) formed with serrations is connected with a boss 270 which includes second serrations 242 formed on the outer circumferential surface thereof in an axial direction thereof.

The boss 270 includes a hole 240 in which serrations are formed in the axial direction to be connected with the driving shaft 105 of the motor 180.

However, since the damping coupler of the conventional electric power steering apparatus as described above is configured such that the driving shaft of the motor and the outer rotor are serration-engaged with each other and the worm shaft and the inner rotor are serration-engaged with each other, it is necessary to align the serrations when coupling the damping coupler to the driving shaft and the worm shaft so as to assemble the damping coupler. Accordingly, assemblability is poor and increases the time required for assembly.

In addition, the elastic body provided between the outer rotor and the inner rotor rather suppresses the movement of the worm shaft in the radial direction, which deteriorates a clearance compensating function of the damping coupler.

SUMMARY OF THE INVENTION

Accordingly, the present invention has been made to solve the above-mentioned problems occurring in the prior art, and an object of the present invention is to provide an electric power steering apparatus for a vehicle and a method of assembling the same in which an elastic member provided between a boss and a worm shaft does not suppress the movement of the worm shaft in an axial direction and a radial direction, an assembly process of a driving shaft of a motor and the worm shaft can be simplified, and the time required for assembly can be reduced.

The objects of the present invention are not limited thereto and other objects which have not been described may be apparently understood by a person ordinarily skilled in the art from the following descriptions.

According to an exemplary embodiment of the present invention, there is provided an electric power steering apparatus including: a boss having a coupling hole formed at one end thereof and an insertion hole formed at the other end in a shape extending in a spoke-like pattern in a radial direction from a center thereof, a driving shaft of a motor being inserted into the coupling hole; an elastic member having vanes extending in the spoke-like pattern in the radial direction from a center thereof to be inserted into and engaged in the insertion hole, the elastic member being closed at one axial end and formed with a fastening hole at the other axial end in a shape extending in a spoke-like pattern from the center thereof, and the radial length of the vanes being set to be shorter than the radial length of the portions extending in the spoke-like pattern in the insertion hole such that a predetermined clearance space is formed between each of the vanes and an inner wall of the insertion hole in the radial direction at each of the portions extending in the spoke-like pattern in the insertion hole in the portions extending in the spoke-like pattern in the insertion hole; and a worm shaft having coupling portions at one end of an outer circumferential surface thereof, the coupling portions extending in the spoke-like pattern in a radial direction to be inserted into and engaged in the fastening hole.

According to another exemplary embodiment of the present invention, there is provided a method assembling an electric power steering apparatus for a vehicle. The method includes: coupling a boss and an elastic member with each other, wherein the boss has a coupling hole formed at one end thereof and an insertion hole formed at the other end in a shape extending in a spoke-like pattern in a radial direction from a center thereof, a driving shaft of a motor being inserted into the coupling hole, and the elastic member has vanes extending in the spoke-like pattern in the radial direction from a center thereof, the elastic member being closed at one axial end and formed with a fastening hole at the other axial end in a shape extending in a spoke-like pattern from the center thereof, and the radial length of the vanes being set to be shorter than the radial length of the portions extending in the spoke-like pattern in the insertion hole; coupling the boss coupled with the elastic member to the driving shaft of the motor; and coupling a worm shaft to the elastic member, wherein the worm shaft has, at one end of an outer circumferential surface thereof, coupling portions extending in the spoke-like pattern in a radial direction to be inserted into and engaged in the fastening hole, and a protrusion formed in the axial direction on the one end of the worm shaft.

According to the present invention, an elastic member provided between a boss and a worm shaft does not suppress the movement of the worm shaft in the axial direction and in the radial direction.

In addition, according to the present invention, a process of assembling the driving shaft of the motor and the worm shaft can be simplified, and the time required for assembly can be reduced.

BRIEF DESCRIPTION OF THE DRAWINGS

The above and other objects, features and advantages of the present invention will be more apparent from the following detailed description taken in conjunction with the accompanying drawings, in which:

FIGS. 6a to 6c illustrate assembling steps of the part illustrated in FIG. 3.

DETAILED DESCRIPTION OF THE PREFERRED EMBODIMENTS

Hereinafter, exemplary embodiments of the present invention will be described with reference to the accompanying drawings.

Figure 1:
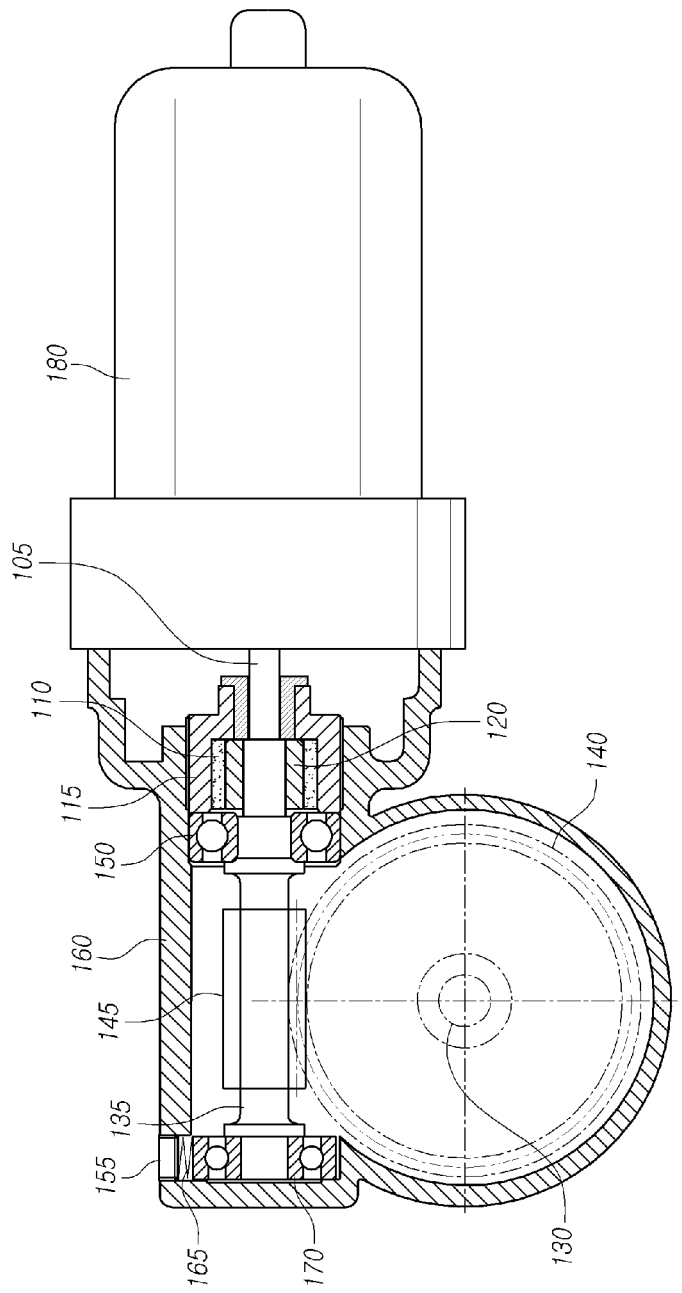
FIG. 1 is a cross-sectional view illustrating a part of a motor and a speed reduction mechanism of the motor in a conventional electric power steering apparatus.
Figure 2:
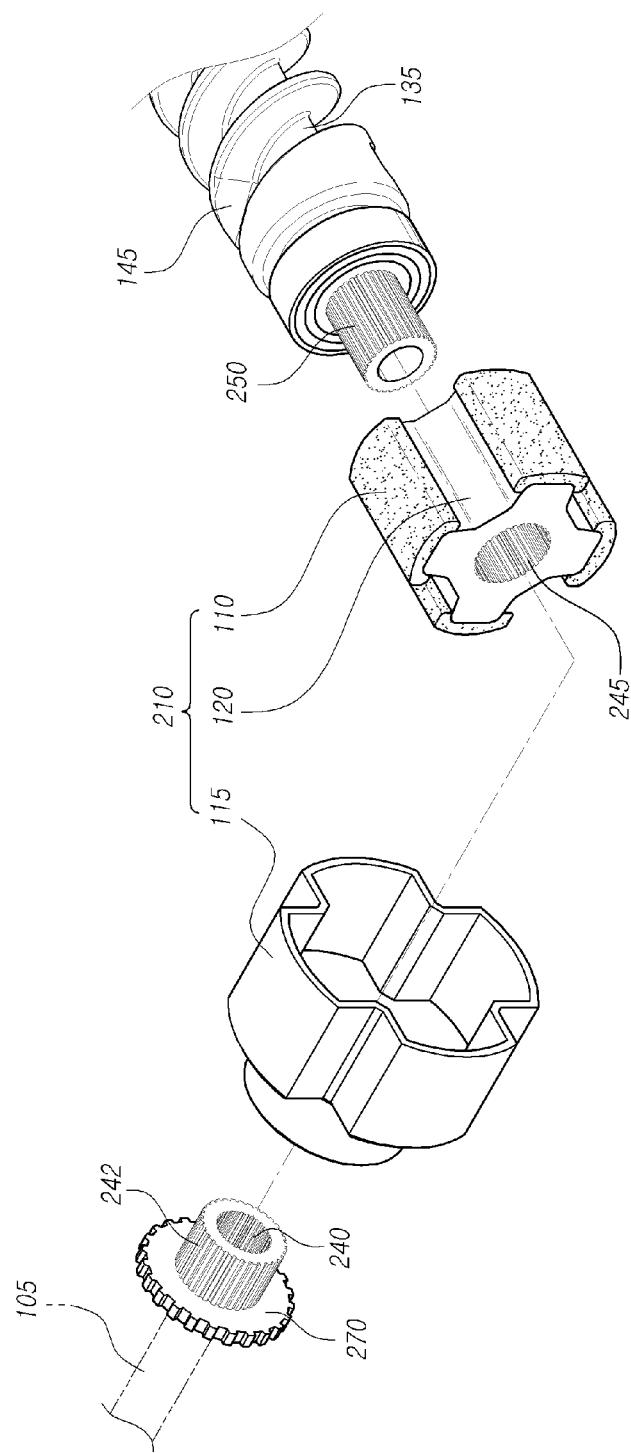
FIG. 2 is an exploded perspective view illustrating a part of the motor and the speed reduction mechanism of the motor in the conventional electric power steering apparatus.
Figure 3:
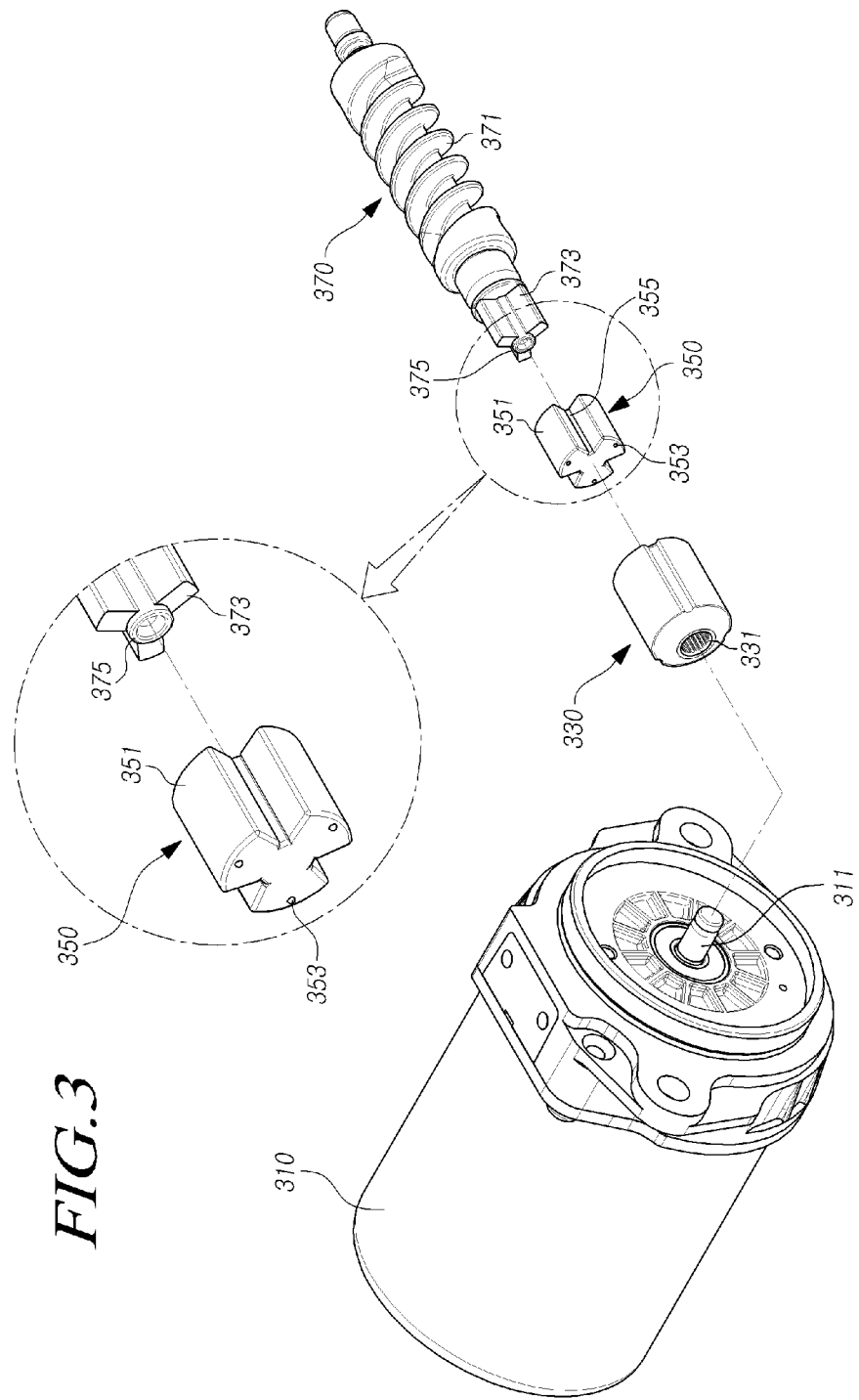
FIG. 3 is an exploded perspective view of a part of an electric power steering apparatus according to an exemplary embodiment of the present invention.
Figure 4:
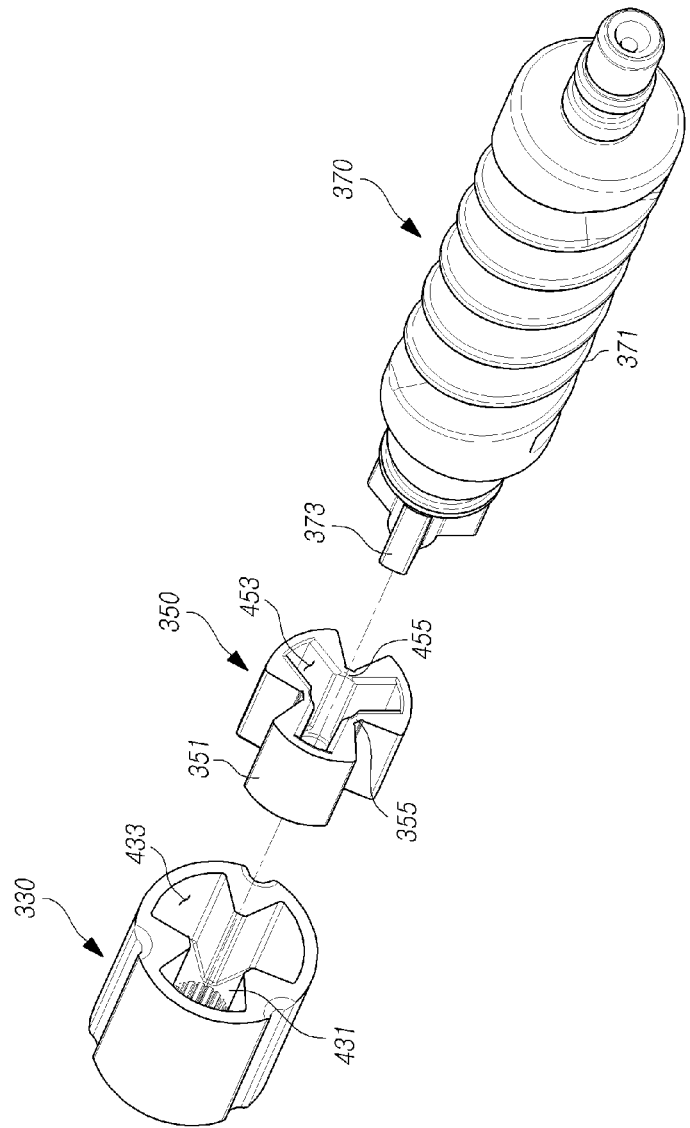
FIG. 4 is an exploded perspective view illustrating a part of FIG. 3 in more detail.
Figure 5:
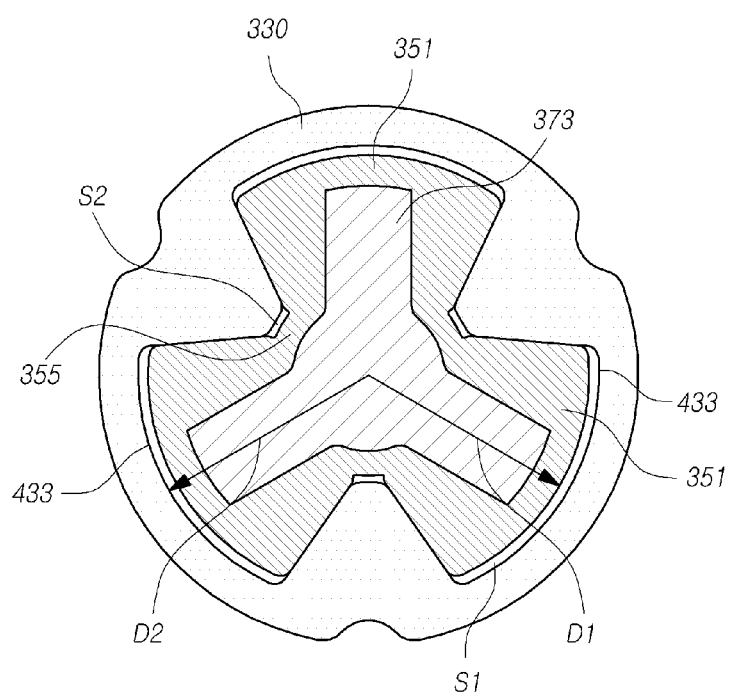
FIG. 5 is a cross-sectional view illustrating an assembled state of the components of FIG. 4.

FIG. 3 is an exploded perspective view of a part of an electric power steering apparatus according to an exemplary embodiment of the present invention. FIG. 4 is an exploded perspective view illustrating a part of FIG. 3 in more detail. FIG. 5 is a cross-sectional view illustrating an assembled state of the components of FIG. 4. FIGS. 6a to 6c illustrate assembling steps of the part illustrated in FIG. 3.

As illustrated in the drawings, an electric power steering apparatus according to an exemplary embodiment of the present invention includes: a boss 330 having a coupling hole 331 formed at one end thereof and an insertion hole 433 formed at the other end in a shape extending in a spoke-like pattern in a radial direction from a center thereof, a driving shaft 311 of a motor 310 being inserted into the coupling hole 331; an elastic member 350 having vanes 351 extending in the spoke-like pattern in the radial direction from a center thereof to be inserted into and engaged in the insertion hole 433, the elastic member 350 being closed at one axial end and formed with a fastening hole 453 at the other axial end in a shape extending in a spoke-like pattern from the center thereof, and the radial length of the vanes 351 being set to be shorter than the radial length of the portions extending in the spoke-like pattern in the insertion hole 433 such that a predetermined clearance space is formed between each of the vanes 351 and an inner wall of the insertion hole 433 in the radial direction at each of the portions extending in the spoke-like pattern in the insertion hole 433 in the portions extending in the spoke-like pattern in the insertion hole 433; and a worm shaft 370 having coupling portions 373 at one end of an outer circumferential surface thereof, the coupling portions 373 extending in the spoke-like pattern in a radial direction to be inserted into and engaged in the fastening hole 453.

The motor 310 has a driving shaft 311 extending outside the motor housing.

The boss 330 has a configuration in which the coupling hole 331, into which the driving shaft 311 of the motor 310 is inserted, is formed at the one end thereof, and the insertion hole 433 is formed at the other end in a shape extending in the spoke-like pattern from the center in the radial direction.

Meanwhile, on the outer circumferential surface of the driving shaft 311 of the motor 310, serrations (not illustrated) are formed in the axial direction, and also on the inner circumferential surface of the coupling hole 331, serrations are formed such that the driving shaft 311 of the motor 310 and the boss 330 may be serration-engaged with each other.

In addition, the insertion hole 433 formed at the other end of the boss 330 may be formed in a shape extending in a spoke-like pattern from the center in the radial direction. In the present exemplary embodiment, an example is illustrated in which the insertion hole 433 includes three recesses which are arranged at equidistant intervals in the circumferential direction of the insertion hole 433 and extend in the radial direction from the longitudinal axis of the boss 330 in such a manner that the width of each of the recesses is gradually increased toward the outer circumference in the radial direction.

Meanwhile, bumps 353 are formed around a peripheral edge of one axial end surface of the elastic member 350. When the elastic member 350 is inserted into the insertion hole 433 of the boss 330, the bumps 353 come in contact with a peripheral surface 431 of the coupling hole 331 (the peripheral surface also forms a bottom surface of the insertion hole 433 at one side of the insertion hole 433) which is perpendicular to the central axis inside the boss 330, as described below.

The elastic member 350 has the vanes 351 extending in a spoke-like pattern from the center in the radial direction to be inserted into and engaged in the insertion hole 433 formed in the boss 330. The one axial end of the elastic member 350 is closed, and the other end is formed with the fastening hole 453 having a shape extending in a spoke-like pattern from the center in the radial direction along the vanes 351.

The elastic member 350 may be formed of an elastic material such as urethane, a natural rubber material or polyester elastomer (PE).

In addition, the radial length of the vanes 351 is set to be shorter than the radial length of the insertion hole 433 such that, when the elastic member 350 is inserted into and engaged in the insertion hole 433 of the boss 330, a predetermined clearance space S1 is formed between the vanes 351 and an inner wall of the insertion hole 433 in the radial direction (see FIG. 5).

That is, as illustrated in FIG. 5, the radial length D1 of the vanes 351 of the elastic member 350 in the radial direction is set to be shorter than the radial length D2 of the insertion holes 433 formed in the boss 330 by a predetermined extent such that the predetermined clearance space (S1) is formed between the vanes 351 of the elastic member 350 and the inner wall of the insertion hole 433 of the boss 330 in the radial direction.

Since the radial length of the vanes 351 is set to be shorter than the radial length of the insertion hole 433 such that the predetermined clearance space S1 is formed between the vane 351 and the insertion hole 433 in the radial direction as described above, the movement of the worm shaft 370 in the radial direction is not disturbed by the elastic member 350.

In addition, a predetermined clearance space S2 is also formed between each connection portion 355 which interconnects adjacent vanes 351 and the inner circumferential surface of the insertion hole 433 at the positions where the connection portions 355 are disposed such that the elastic member 350 does not disturb the movement of the worm shaft 370 in the radial direction.

Whereas, the opposite side surfaces of each of the vanes 351 of the elastic member 350 in the circumferential direction are in close contact with the inner circumferential surface insertion hole 433 that faces the opposite side portions. Since the opposite sides of each vane 351 of the elastic member 350 are in close contact with the inner circumferential surface of the insertion hole 433 in the circumferential direction as described above, the rotational force of the driving shaft 311 of the motor 310 can be wholly transferred to the worm shaft 370 without being lost.

As described above, the bumps 353 are further formed at the peripheral edge on the one axial end surface of the elastic member 350 to come in contact with the peripheral surface 431 of the coupling hole 331 of the boss 330. The bumps 353 form a clearance space between the circumferential edge of the axial one end surface of the elastic member 350 and the peripheral surface 431 of the coupling hole 331 of the boss 330 such that the axial movement of the worm shaft 370 is not suppressed by the elastic member 350.

A worm 371 is formed on an outer circumferential surface of the worm shaft 370 to be engaged with the worm wheel 140. At one end of the outer circumferential surface of the worm shaft 370, the coupling portions 373 are formed to extend in a spoke-like pattern. The coupling portions 373 are inserted into the fastening hole 453 of the elastic member 350.

By forming the coupling portions 373 extending in the spoke-like pattern at one end of the outer circumferential surface of the worm shaft 370, the worm shaft 370 and the elastic member 350, and further the boss 330 or the like may be stably assembled.

Meanwhile, a protrusion 375 is further formed in the axial direction on the one end of the worm shaft 370 to center the worm shaft 370 when the worm shaft 370 is inserted into the fastening hole 453 of the elastic member 350. In order to allow the protrusion 375 of the worm shaft 370 to be smoothly inserted into the center of the fastening hole 453 of the elastic member 350, tapered surfaces 455 are formed on the edges of the center of the fastening hole 453 and in addition, in order to allow the coupling portion 373 of the worm shaft 370 to be smoothly inserted into the fastening hole 453, the remaining edges of the fastening hole 453 (other than the above-described taper surfaces 455) may also be tapered.

Referring to FIG. 6 as well as FIGS. 3 to 5, a method of assembling the motor, the boss, the elastic member, the worm shaft, etc. in the electric power steering apparatus for a vehicle according to the exemplary embodiment of the present invention will be described in detail.

First, the boss 330 and the elastic member 350 are coupled to each other (step of coupling the boss and the elastic). Here, as described above, the boss 330 has a configuration in which the coupling hole 331, into which the driving shaft 311 of the motor 310 is inserted, is formed at one side thereof, and the insertion hole 433 is formed at the other side in the shape extending in the spoke-like pattern from the center in the radial direction. The elastic member 350 has the vanes 351 extending in the spoke-like pattern from the center in the radial direction to be inserted into and engaged in the insertion hole 433 formed in the boss 330. The one axial end of the elastic member 350 is closed, and the other end is formed with the fastening hole 453 which extends in the spoke-like pattern from the center in the radial direction along the vanes 351. The radial length of the vanes 351 is to be shorter than the radial length of the insertion hole 433 such that a predetermined clearance space S1 is formed between the vanes 351 and an inner wall of the insertion hole 433 in the radial direction Subsequently, the boss 330 coupled with the elastic member 350 is coupled to the driving shaft 311 of the motor 310 (step of coupling the driving shaft and the boss).

Unlike the foregoing, an example, in which the boss 330 is coupled to the driving shaft 311 of the motor 310 (step of coupling the driving shaft and the boss), and then the elastic member 350 is coupled to the boss 330 (step of coupling the boss and the elastic member), is also possible.

Consequently, the worm shaft 370 is coupled to the elastic member 350 (step of coupling the elastic member and the worm shaft), in which the worm shaft 370 is tooth-coupled with the worm wheel 140 since the worm 371 is formed on the outer circumferential surface and the coupling portions 373 extending spoke-like pattern are formed at one end of the outer circumferential surface to be inserted into and engaged in the fastening hole 453.

Referring to one example of the coupling step of the elastic member 350 and the worm shaft 370 in more detail, the worm shaft 370 is laid under the motor 310, the centers of the protrusion 375 of the worm shaft 370 and the fastening hole 453 of elastic member 350 are aligned on a coaxial line, and then the worm shaft 370 is rotated such that the coupling portion 373 of the worm shaft 370 can be inserted into the fastening hole 453 of the elastic member 350 by the weight of the motor 310 to be engaged in the fastening hole 453 of the elastic member 350 (see FIGS. 6b and 6c).

As described above, when the worm shaft 370 is rotated at the step of coupling the elastic member and the worm shaft, the motor 310 is moved downward by its weight at the time when the coupling portion 373 of the worm shaft 370 and the fastening hole 453 of the elastic member 350 are aligned with each other such that the coupling portion 373 of the worm shaft 370 can be automatically inserted into the fastening hole 453 of the elastic member 350. Consequently, the motor 310 and the worm shaft 370 are coupled to each other.

In addition, when the centers of the protrusion 375 of the worm shaft 370 and the fastening hole 453 and the elastic member 350 are aligned with the coaxial line, the aligned centers of the worm shaft 370 and the fastening hole 453 of the elastic member 350 are not deviated from each other when the worm shaft 370 is rotated. Therefore, the worm shaft 370 and the elastic member 350 can be easily coupled to each other.

As described above, according to the above-described exemplary embodiment of the present invention, it is possible to prevent the elastic member provided between the boss and the worm shaft from suppressing the movement of the worm shaft in the axial direction and the radial direction.

In addition, according to the exemplary embodiment of the present invention, the process of assembling the driving shaft of the motor and the worm shaft can be simplified and the time required for assembly can be reduced.

What is claimed is:

1. An electric power steering apparatus comprising:
    a boss having a coupling hole formed at one end thereof and an insertion hole formed at the other end in a shape extending in a spoke-like pattern in a radial direction from a center thereof, a driving shaft of a motor being inserted into the coupling hole;
    an elastic member having vanes extending in the spoke-like pattern in the radial direction from a center thereof to be inserted into and engaged in the insertion hole, the elastic member being closed at one axial end and formed with a fastening hole at the other axial end in a shape extending in a spoke-like pattern from the center thereof, and a radial length of the vanes being set to be shorter than that of the portions extending in the spoke-like pattern in the insertion hole such that a first predetermined clearance space is formed between each of the vanes and an inner wall of the insertion hole in the radial direction at each of the portions extending in the spoke-like pattern in the insertion hole in the portions extending in the spoke-like pattern in the insertion hole; and
    a worm shaft having coupling portions at one end of an outer circumferential surface thereof, the coupling portions extending in the spoke-like pattern in a radial direction to be inserted into and engaged in the fastening hole,
    wherein the elastic member further includes a connection portion interconnecting adjacent vanes so that a second predetermined clearance space is formed between the connection portion and an inner circumferential surface of the insertion hole.

2. The electric power steering apparatus of claim 1, wherein the opposite side surfaces of each of the vanes of the elastic member in the circumferential direction are in close contact with the inner circumferential surface of the insertion hole.

3. The electric power steering apparatus of claim 1, wherein bumps are formed around a peripheral edge of the one axial end surface of the elastic member to come in contact with a peripheral surface of the insertion hole of the boss.

4. The electric power steering apparatus of claim 2, bumps are formed around a peripheral edge of the one axial end surface of the elastic member to come in contact with a peripheral surface of the insertion hole of the boss.

5. The electric power steering apparatus of claim 1, wherein a protrusion is formed in the axial direction on the one end of the worm shaft to center the worm shaft when the worm shaft is inserted into the fastening hole of the elastic member.

6. The electric power steering apparatus of claim 2, wherein a protrusion is formed in the axial direction on the one end of the worm shaft to center the worm shaft when the worm shaft is inserted into the fastening hole of the elastic member.

7. The electric power steering apparatus of claim 3, wherein a protrusion is formed in the axial direction on the one end of the worm shaft to center the worm shaft when the worm shaft is inserted into the fastening hole of the elastic member.

8. The electric power steering apparatus of claim 4, wherein a protrusion is formed in the axial direction on the one end of the worm shaft to center the worm shaft when the worm shaft is inserted into the fastening hole of the elastic member.

9. A method of assembling an electric power steering apparatus for a vehicle, the method comprising:
    coupling a boss and an elastic member with each other, wherein the boss has a coupling hole formed at one end thereof and an insertion hole formed at the other end in a shape extending in a spoke-like pattern in a radial direction from a center thereof, a driving shaft of a motor being inserted into the coupling hole, and the elastic member has vanes extending in the spoke-like pattern in the radial direction from a center thereof, the elastic member being closed at one axial end and formed with a fastening hole at the other axial end in a shape extending in a spoke-like pattern from the center thereof, and a radial length of the vanes being set to be shorter than that of the portions extending in the spoke-like pattern in the insertion hole such that a first predetermined clearance space is formed between each of the vanes and an inner wall of the insertion hole in the radial direction at each of the portions extending in the spoke-like pattern in the insertion hole in the portions extending in the spoke-like pattern in the insertion hole;
    coupling the boss coupled with the elastic member to the driving shaft of the motor; and
    coupling a worm shaft to the elastic member, wherein the worm shaft has, at one end of an outer circumferential surface thereof, coupling portions extending in the spoke-like pattern in a radial direction to be inserted into and engaged in the fastening hole, and a protrusion formed in the axial direction on the one end of the worm shaft,
    wherein the elastic member further includes a connection portion interconnecting adjacent vanes so that a second predetermined clearance space is formed between the connection portion and an inner circumferential surface of the insertion hole.

10. A method of assembling an electric power steering apparatus for a vehicle, the method comprising:
    coupling a driving shaft and a boss with each other, wherein the boss has a coupling hole formed at one end thereof and an insertion hole formed at the other end in a shape extending in a spoke-like pattern in a radial direction from a center thereof, the driving shaft of the motor being inserted into the coupling hole;
    coupling the boss and an elastic member with each other, wherein the elastic member has vanes extending in the spoke-like pattern in the radial direction from a center thereof, the elastic member being closed at one axial end and formed with a fastening hole at the other axial end in a shape extending in a spoke-like pattern from the center thereof, and a radial length of the vanes being set to be shorter than that of the portions extending in the spoke-like pattern in the insertion hole such that a first predetermined clearance space is formed between each of the vanes and an inner wall of the insertion hole in the radial direction at each of the portions extending in the spoke-like pattern in the insertion hole in the portions extending in the spoke-like pattern in the insertion hole; and
    coupling a worm shaft to the elastic member, wherein the worm shaft has, at one end of an outer circumferential surface thereof, coupling portions extending in the spoke-like pattern in a radial direction to be inserted into and engaged in the fastening hole, and a protrusion formed in the axial direction on the one end of the worm shaft, wherein the elastic member further includes a connection portion interconnecting adjacent vanes so that a second predetermined clearance space is formed between the connection portion and an inner circumferential surface of the insertion hole.

11. The method of claim 9 wherein, when coupling the elastic member and the worm shaft, the worm shaft is laid under the motor, the centers of the protrusion of the worm shaft and the fastening hole of elastic member are aligned with a coaxial line, and then the worm shaft is rotated such that the coupling portion of the worm shaft can be inserted into the fastening hole of the elastic member by the weight of the motor to be engaged in the fastening hole of the elastic member.

12. The method of claim 10, wherein, when coupling the elastic member and the worm shaft, the worm shaft is laid under the motor, the centers of the protrusion of the worm shaft and the fastening hole of elastic member are aligned with a coaxial line, and then the worm shaft is rotated such that the coupling portion of the worm shaft can be inserted into the fastening hole of the elastic member by the weight of the motor to be engaged in the fastening hole of the elastic member.

* * * * *